US012616628B2

(12) United States Patent
Younger

(10) Patent No.: US 12,616,628 B2
(45) Date of Patent: May 5, 2026

(54) WALKER

(71) Applicant: Medical Depot, Inc., Port Washington, NY (US)

(72) Inventor: Max Jefferies Younger, Roeland Park, KS (US)

(73) Assignee: Medical Depot, Inc., Port Washington, NY (US)

( * ) Notice: Subject to any disclaimer, the term of this patent is extended or adjusted under 35 U.S.C. 154(b) by 215 days.

(21) Appl. No.: 18/679,406

(22) Filed: May 30, 2024

(65) Prior Publication Data

US 2024/0398654 A1 Dec. 5, 2024

Related U.S. Application Data

(60) Provisional application No. 63/506,363, filed on Jun. 5, 2023.

(51) Int. Cl.
*A61H 3/04* (2006.01)
*A61G 5/08* (2006.01)

(52) U.S. Cl.
CPC ............. *A61H 3/04* (2013.01); *A61G 5/0816* (2016.11); *A61G 5/0825* (2016.11); *A61H 2201/1633* (2013.01)

(58) Field of Classification Search
CPC .............. A61H 3/04; A61H 2201/1633; A61H 2201/0161; A61G 5/0816; A61G 5/0825
USPC .............. 135/67; 280/87.021; 297/5, DIG. 4, 297/16.2, 42
See application file for complete search history.

(56) References Cited

U.S. PATENT DOCUMENTS

| | | | | | |
|---|---|---|---|---|---|
| 2,866,495 | A * | 12/1958 | Diehl | A61G 5/08 | 297/42 |
| 7,108,004 | B2 | 9/2006 | Cowie et al. | | |
| 7,377,285 | B2 * | 5/2008 | Karasin | A61H 3/04 | 482/68 |
| 8,333,208 | B2 * | 12/2012 | Miller | A61H 3/04 | 135/74 |
| 9,707,140 | B2 * | 7/2017 | Andersen | A61G 5/02 | |
| 10,053,062 | B2 * | 8/2018 | Liu | B60T 1/04 | |
| 11,220,246 | B2 * | 1/2022 | Liu | B60T 11/046 | |
| 11,633,321 | B2 * | 4/2023 | Miller | A61H 3/04 | 280/650 |
| 12,109,168 | B2 * | 10/2024 | Hooworth | A61G 5/0808 | |
| 12,274,662 | B2 * | 4/2025 | Orrell-Jones | A61G 5/0825 | |
| 2005/0076939 | A1 * | 4/2005 | Karasin | A61H 3/04 | 135/67 |

(Continued)

FOREIGN PATENT DOCUMENTS

| | | |
|---|---|---|
| CN | 201008623 Y | 1/2008 |
| CN | 213130639 U | 5/2021 |

OTHER PUBLICATIONS

Written Opinion of the International Searching Authority, Sep. 12, 2024, PCT/US2024/031796.

*Primary Examiner* — Robert Canfield
(74) *Attorney, Agent, or Firm* — Bradley J. Shelowitz

(57) ABSTRACT

A walker includes first and second side frames configured to collapse laterally toward one another from an unfolded configuration to a folded configuration. The walker includes a seat extending between and supported by the first and second side frames, and a folding mechanism positioned underneath the seat and acting independently of the seat.

20 Claims, 5 Drawing Sheets

(56) References Cited

U.S. PATENT DOCUMENTS

| | | | | |
|---|---|---|---|---|
| 2008/0121258 | A1* | 5/2008 | Lin | A61H 3/00<br>135/74 |
| 2010/0319741 | A1* | 12/2010 | Ohayon | A61H 3/04<br>135/67 |
| 2011/0094550 | A1* | 4/2011 | Miller | A61H 3/04<br>135/85 |
| 2015/0245973 | A1* | 9/2015 | Liu | A61H 3/04<br>280/47.34 |
| 2016/0038369 | A1* | 2/2016 | Andersen | A61G 5/02<br>297/5 |
| 2018/0140497 | A1 | 5/2018 | Janeczek et al. | |
| 2022/0110818 | A1* | 4/2022 | Orrell-Jones | A61H 3/04 |
| 2023/0028131 | A1* | 1/2023 | Hooworth | A61G 5/0841 |
| 2023/0128389 | A1* | 4/2023 | Whitmore | A61H 3/04<br>280/641 |

* cited by examiner

WALKER

CROSS-REFERENCE TO RELATED APPLICATION

The present application claims the benefit of and priority to U.S. Provisional Patent Application No. 63/506,363, filed on Jun. 5, 2023, the entire contents of which being incorporated by reference herein.

BACKGROUND

The present disclosure relates to mobility aids, and more particularly, to walkers. Walkers facilitate an individual's ability to walk and be independently mobile by providing stabilization, support, and/or reducing the burden on the individual's lower body. A typical walker includes a pair of left and right side frames supported at a front end thereof by two wheels and supported at a rear end thereof by two, non-rolling feet. Walkers, in contrast with rollators, typically do not have a seat and have no more than two wheels, and in some aspects, no wheels. There is a continuing need for improving the usability, foldability, transportability, and/or convenience of use of walkers.

SUMMARY

In accordance with an aspect of the present disclosure, a walker for aiding mobility of a user is provided and includes a first side frame, a second side frame spaced laterally from the first side frame, a seat, and a first folding mechanism positioned underneath the seat. Each of the first and second side frames includes a front leg supporting a wheel, a rear leg supporting a foot, a handle bar interconnecting the front and rear legs, and a seat bar extending between and fixed to the front and rear legs. The seat is supported between the first and second seat bars and is configured to collapse when the first and second side frames transition from an unfolded configuration to a folded configuration. The first folding mechanism includes a first locking bar and a second locking bar. The first locking bar has a first end portion rotationally coupled to the first seat bar, and a second end portion. The second locking bar has a first end portion rotationally coupled to the second seat bar, and a second end portion extending alongside and rotationally coupled to the second end portion of the first locking bar.

In aspects, the first and second locking bars may be spaced below and extend in parallel relation with the seat when the first and second side frames are in the unfolded configuration.

In aspects, the first and second locking bars may extend parallel with one another and in a horizontal orientation when the first and second side frames are in the unfolded configuration. The first and second locking bars may extend parallel with one another and in a vertical orientation when the first and second side frames are in the folded configuration.

In aspects, the first and second locking bars may be positioned underneath the seat in each of the unfolded and folded configurations of the first and second side frames.

In aspects, the first end portion of each of the first and second locking bars may curve upwardly.

In aspects, the second end portion of each of the first and second locking bars may be linear.

In aspects, the first folding mechanism may further include a first pair of arms non-rotationally coupled to the first seat bar and a second pair of arms non-rotationally coupled to the second seat bar. The first end portion of the first locking bar may be rotationally supported by the first pair of arms, and the first end portion of the second locking bar may be rotationally supported by the second pair of arms.

In aspects, the first pair of arms may extend below and inwardly of the first seat bar, and the second pair of arms may extend below and inwardly of the second seat bar such that the first end portions of the first and second locking bars are positioned underneath the seat and laterally inward of the respective first and second side frames.

In aspects, the first locking bar may be longer than the second locking bar.

In aspects, the first folding mechanism may include a plate fixed to the second end portion of the first locking bar and configured to releasably, lockingly engage the second end portion of the second locking bar when the first and second side frames are in the unfolded configuration.

In aspects, the walker may further include a strap having a first end portion extending upwardly through the seat and accessible by a user, and a second end portion connected to the plate such that a tensile force applied to the strap releases the locking engagement between the plate and the second locking bar.

In aspects, the walker may further include a second folding mechanism connected to the front legs of the first and second side frames.

In aspects, the second folding mechanism may include a first arcuate shaft rotationally coupled at its opposing first and second ends to the front legs of the first and second side frames, and a second arcuate shaft rotationally coupled to the first arcuate shaft at a central portion thereof. The second arcuate shaft may be rotationally coupled at its opposing first and second ends to the front legs of the first and second side frames.

In aspects, the walker may further include a first handle assembly that includes a base supported on the first handle bar, a cushion positioned in overlapping alignment with the base, and a gas-filled bladder sandwiched between the base and the cushion.

In accordance with another aspect of the present disclosure, a walker for aiding in mobility of a user is provided and includes a first side frame, a second side frame spaced laterally from the first side frame, a seat, and a first folding mechanism positioned underneath the seat. Each of the first and second side frames includes a front leg and a rear leg. The first folding mechanism is configured to laterally collapse the first and second side frames between an unfolded configuration and a folded configuration. The first folding mechanism may include a first locking bar and a second locking bar each having a first end portion and a second end portion. The first end portion of the first locking bar is rotationally coupled to the first side frame and the first end portion of the second locking bar is rotationally coupled to the second side frame. The second end portion of the second locking bar is rotationally coupled to the second end portion of the first locking bar. The first and second locking bars extend parallel with one another and in a horizontal orientation when the first and second side frames are in the unfolded configuration. The first and second locking bars extend parallel with one another and in a vertical orientation when the first and second side frames are in the folded configuration.

In aspects, the seat may have a first side fixed to the first side frame, and a second side fixed to the second side frame.

As used herein, the terms parallel and perpendicular are understood to include relative configurations that are substantially parallel and substantially perpendicular up to about + or −15 degrees from true parallel and true perpendicular.

As used herein, the term "about" means that the numerical value is approximate and small variations would not significantly affect the practice of the disclosed embodiments. Where a numerical limitation is used, unless indicated otherwise by the context, "about" means the numerical value can vary by ±10% and remain within the scope of the disclosed embodiments.

BRIEF DESCRIPTION OF THE DRAWINGS

Embodiments of the present disclosure are described herein with reference to the accompanying drawings, wherein.

DETAILED DESCRIPTION

Figure 1:
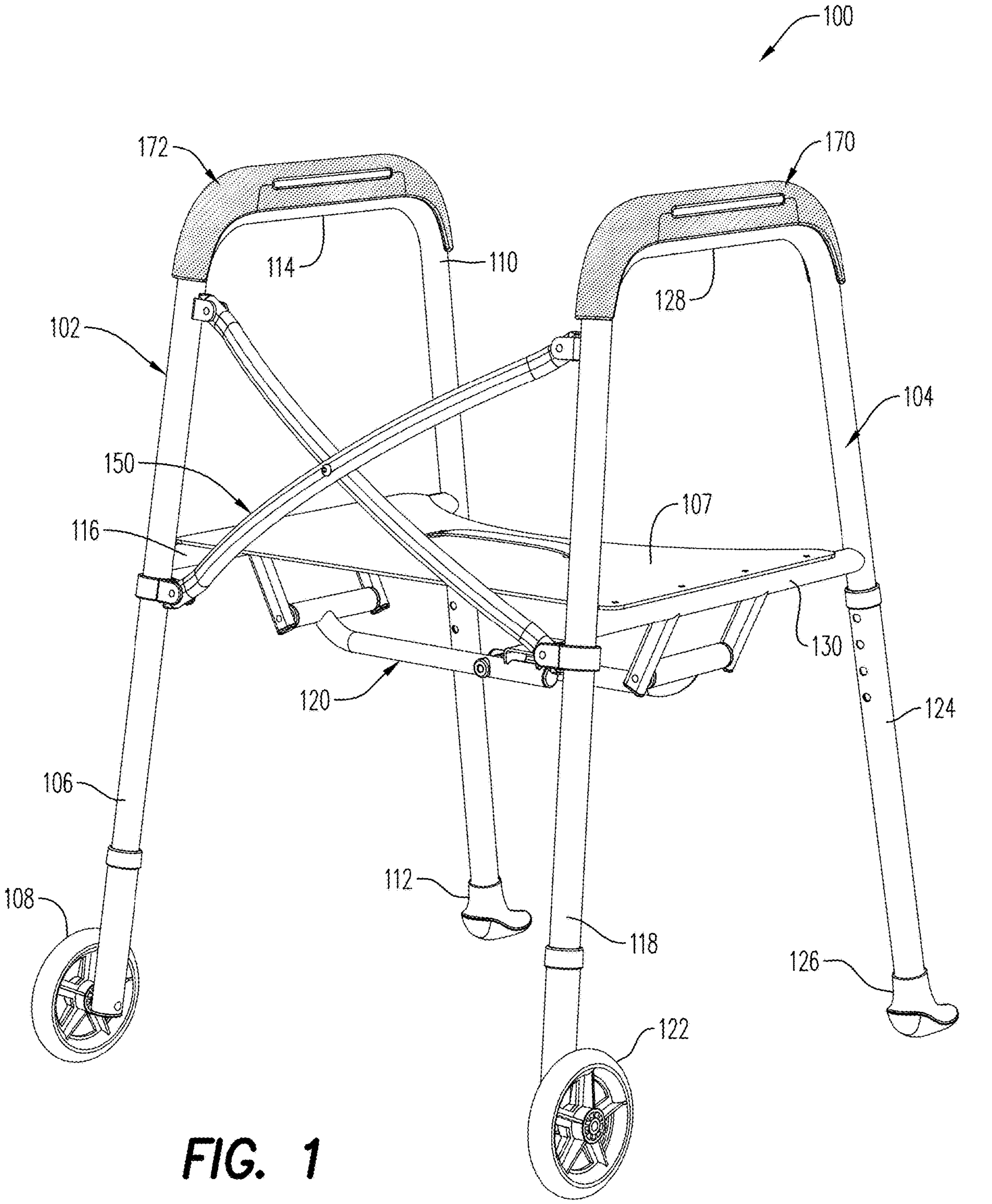
FIG. 1 is a front perspective view illustrating an exemplary embodiment of a walker shown in an in-use or unfolded configuration.

Embodiments of the presently disclosed walkers are described in detail with reference to the drawings, in which like reference numerals designate identical or corresponding elements in each of the several views.

With reference to FIGS. 1-4B, an exemplary embodiment of a mobility aid, such as, for example, a walker, is illustrated and is generally designated 100. As will be described in further detail herein, the walker 100 is configured to transition between an in-use, unfolded, or expanded configuration (FIG. 1), and a folded or stored configuration (FIGS. 4A-4B) utilizing a folding mechanism 120 positioned underneath a seat 107 without interfering with the seat 107 during folding and unfolding.

The walker 100 generally includes a first side frame 102, a second side frame 104 spaced laterally from the first side frame 102, a seat 107, a first folding mechanism 120 positioned underneath the seat 107, and in some aspects, a second folding mechanism 150. The first side frame 102 includes a front leg 106 supporting a wheel 108, a rear leg 110 supporting a foot 112, a first handle bar 114 interconnecting the front and rear legs 106, 110, and a first seat bar 116 extending between and fixed to an intermediate portion of the front and rear legs 106, 110. The first seat bar 116 may be fixed (e.g., non-rotatable and non-slidable) relative to the front and rear legs 106, 110 by welding or other suitable fastening engagements. In aspects, the front and rear legs 106, 110 and the first handle bar 114 may be monolithically formed from a metal tube. In aspects, one or both of the front and rear legs 106, 110 may each include a pair of telescoping tubes with a lock to allow for the selective adjustment of the length of the front and rear legs 106, 110.

The wheel 108 may include a weight-actuated brake (not explicitly shown) configured to lock rotation of the wheel 108 in the absence of a threshold downward force applied to the front leg 106 by a user. The foot 112 may be detachable from the rear leg 110 and is configured to slide along a ground surface (as opposed to roll) and provide a sufficient amount of frictional resistance to movement along the ground surface designed to limit the speed of the walker 100.

The second side frame 104 includes a front leg 118 supporting a wheel 122, a rear leg 124 supporting a foot 126, a second handle bar 128 interconnecting the front and rear legs 118, 124, and a second seat bar 130 extending between and fixed to an intermediate portion of the front and rear legs 118, 124 of the second side frame 104. The second seat bar 130 may be fixed (e.g., non-rotatable and non-slidable) relative to the front and rear legs 118, 124 by welding or other suitable fastening engagements. In aspects, the front and rear legs 118, 124 and the second handle bar 128 may be monolithically formed from a metal tube. In aspects, one or both of the front and rear legs 118, 124 may each include a pair of telescoping tubes with a lock to allow for the selective adjustment of the length of the front and rear legs 118, 124.

Figure 2:
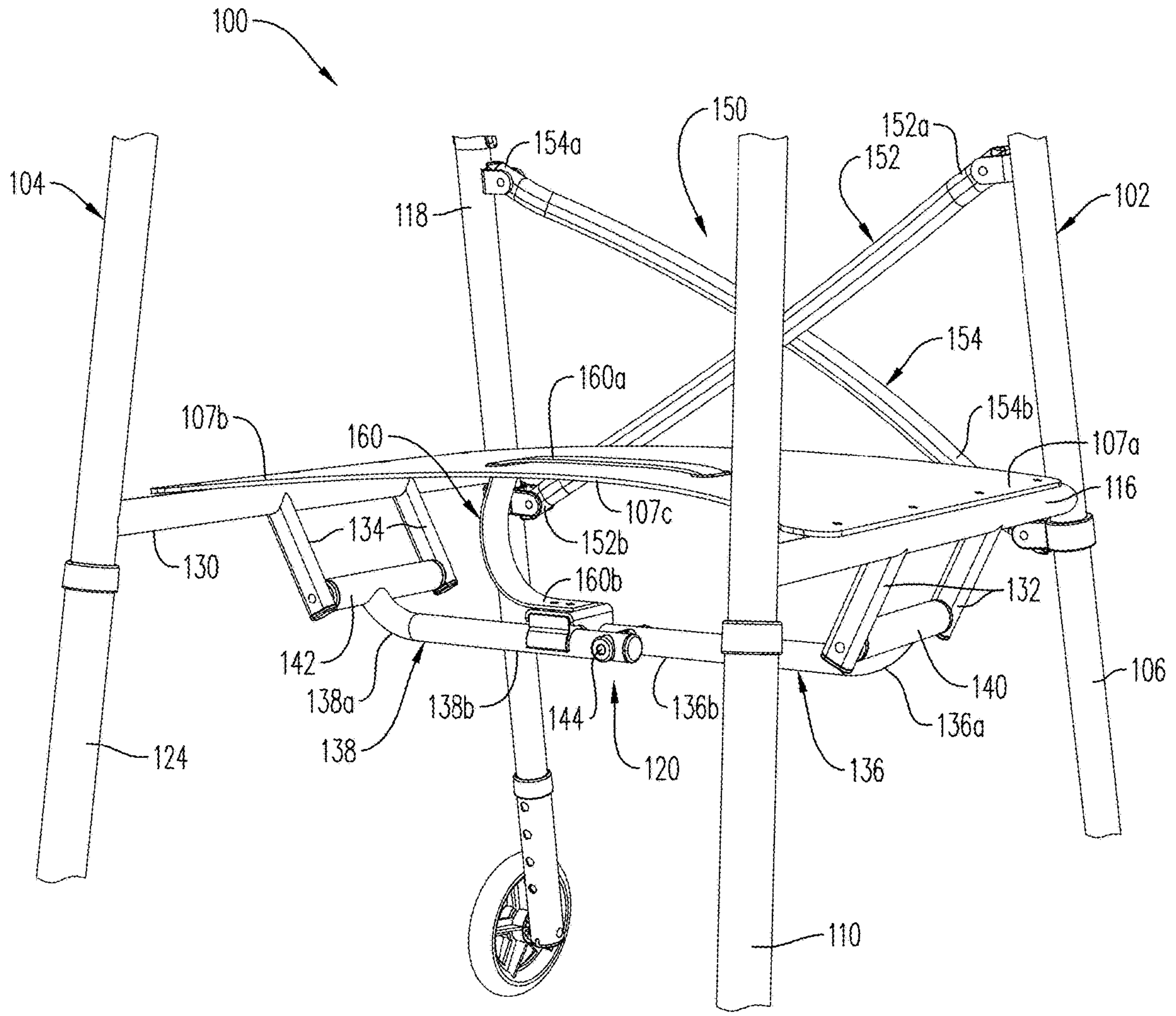
FIG. 2 is an enlarged, rear perspective view of the walker of FIG. 1.
Figure 3:
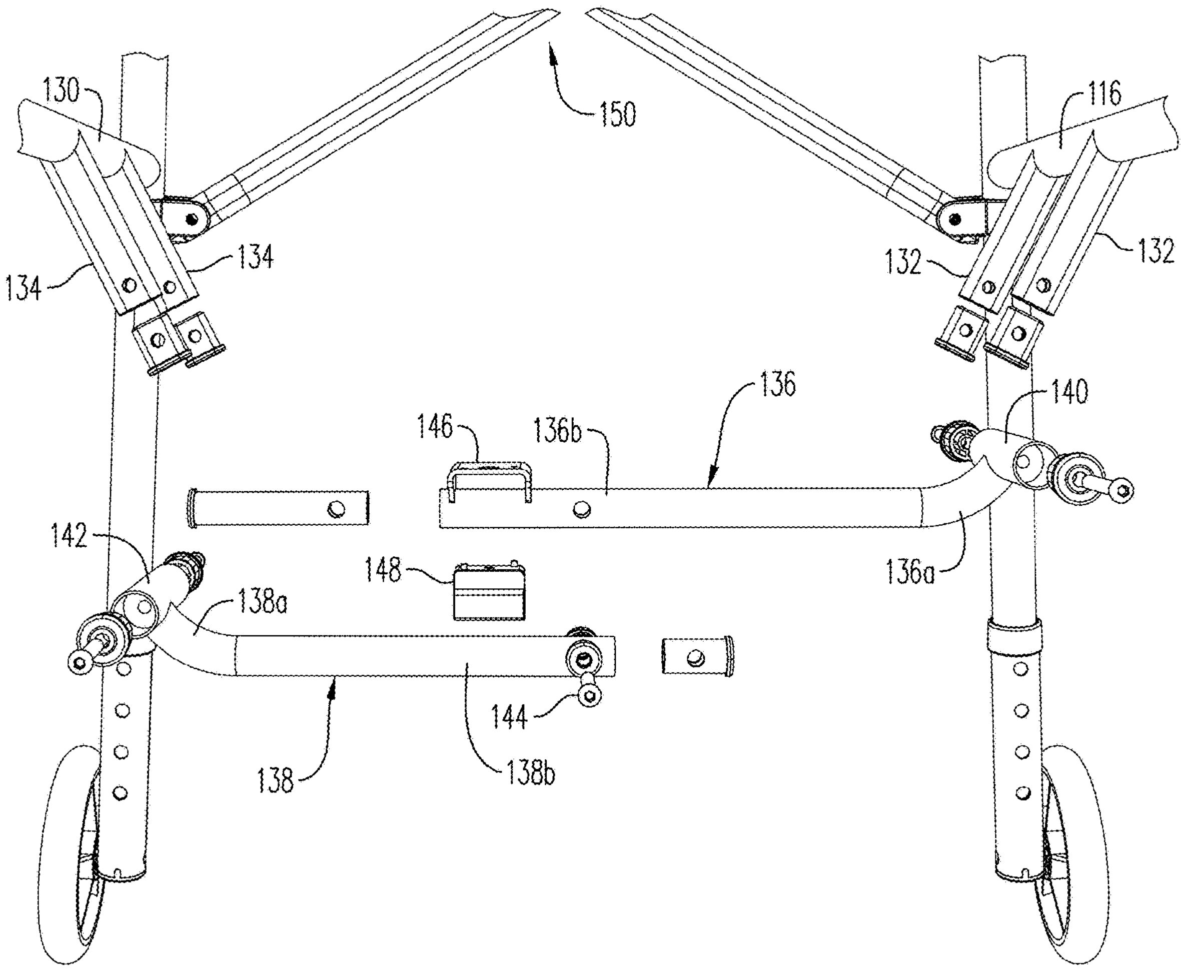
FIG. 3 is a rear view, with parts separated, of a first folding mechanism of the walker of FIG. 1.

With reference to FIG. 2, the seat 107 may be flexible, such as, for example, fabricated from a fabric, and extends between the first and second side frames 102, 104. When the walker 100 is in the expanded configuration, the seat 107 is held taut between the side frames 102, 104 and inhibits further separation between the first and second side frames 102, 104. The seat 107 includes a first side 107*a* secured to the first seat bar 116, and a second side 107*b* secured to the second seat bar 130 and configured to be taut to support a user when a user is seated on the seat 107. The seat 107 is configured to collapse or fold when the first and second side frames 102, 104 transition from the unfolded configuration to the folded configuration. For example, the first and second sides 107*a*, 107*b* of the seat 107 may be adjacent one another and a middle portion 107*c* of the seat 107 may protrude upwardly when the walker 100 is in the folded configuration. In another aspect of the present disclosure, a front end of each of the sides 107*a*, 107*b* of the seat 107 may be pivotably coupled to the seat bars 116, 130 to allow for the seat 107 to flip-up during folding of the walker 100.

With continued reference to FIGS. 1 and 2, the second or front folding mechanism 150 is connected to the front legs 106, 118 of the first and second side frames 102, 104. The front folding mechanism 150 prevents the first and second side frames 102, 104 from wobbling relative to one another and may have an additional function as a backrest when the user is sitting on the seat 107. The front folding mechanism 150 includes a first bar or shaft 152 and a second bar or shaft 154 rotationally coupled to one another at a central point thereof via a pivot pin. The first and second shafts 152, 154 couple to one another to form a criss-cross "X" pattern or a scissor fold.

Figure 4A:
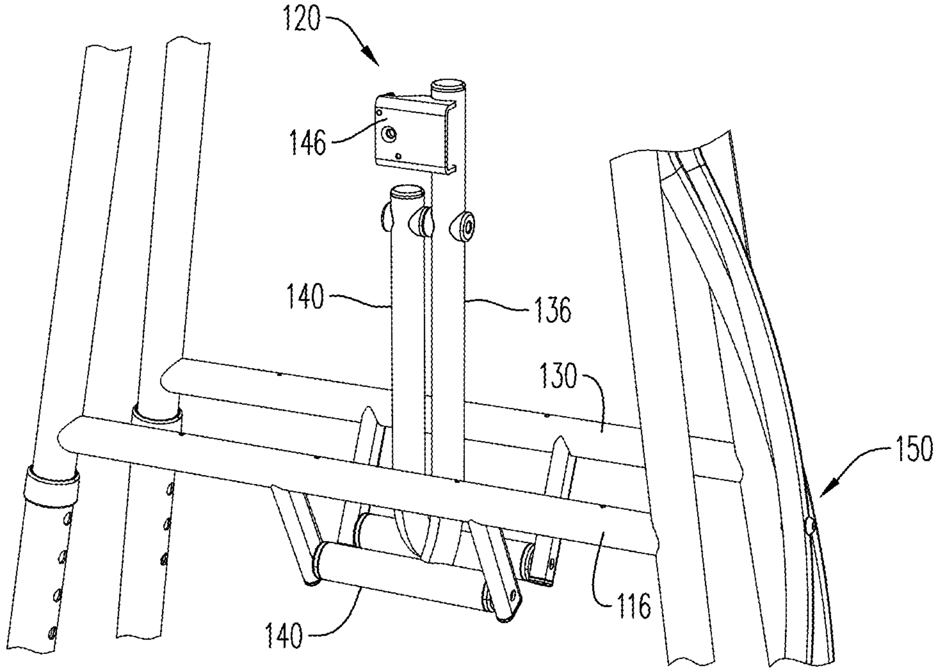
FIG. 4A is a right side, perspective view, illustrating the walker of FIG. 1 in a collapsed or folded configuration.
Figure 4B:
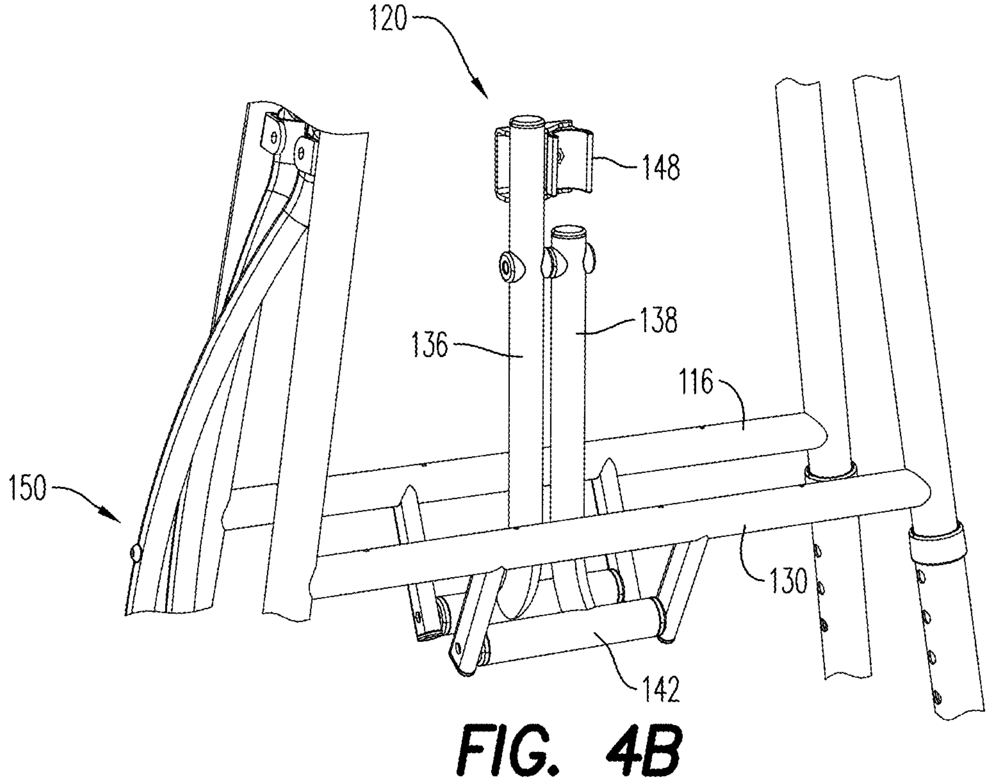
FIG. 4B is left side, perspective view, illustrating the walker of FIG. 1 in the collapsed or folded configuration.

The first shaft 152 has a first end portion 152*a* rotationally coupled (e.g., via a pin connection) to an upper portion of the front leg 106 of the first side frame 102, and a second end portion 152*b* rotationally coupled to an intermediate portion of the front leg 118 of the second side frame 104. The second shaft 154 has a first end portion 154*a* rotationally coupled (e.g., via a pin connection) to an upper portion of the front leg 118 of the second side frame 104, and a second end portion 154*b* rotationally coupled to an intermediate portion of the front leg 106 of the first side frame 102. The first and second shafts 152, 154 may curve along their lengths such that the first and second shafts 152, 154 bow outwardly from the front legs 106, 118. In this way, upon folding of the second folding mechanism 150, a majority of the length of the first and second shafts 152, 154 are positioned in front of, rather than between, the first and second side frames 102, 104 to allow for the first and second side frames 102, 104 to get closer to one another during folding, as shown in FIGS. 4A and 4B.

With reference to FIGS. 2-4B, the first folding mechanism 120 is configured to selectively lock the first and second upright frames 102, 104 in the unfolded or expanded configuration. The first folding mechanism 120 includes a first pair of arms 132 non-rotationally coupled to the first seat bar 116, a second pair of arms 134 non-rotationally coupled to the second seat bar 130, a first locking bar 136, and a second locking bar 138. The first pair of arms 132 are axially spaced from one another along the first seat bar 116 and extend below and inwardly of the first seat bar 116, and the second pair of arms 134 are axially spaced from one another along the second seat bar 130 and extend below and inwardly of the second seat bar 130. As such, the pairs of arms 132, 134 position the first and second locking bars 136, 138 in spaced relation underneath the seat 107 and laterally inward of the respective first and second side frames 102, 104.

The first and second locking bars 136, 138 each have a first end portion 136*a*, 138*a* and a second end portion 136*b*, 138*b*. The first end portion 136*a* of the first locking bar 136 has a first transverse pivot bar 140 rotationally coupled to and supported between the first pair of arms 132, and the first end portion 138*a* of the second locking bar 138 has a second transverse pivot bar 142 rotationally coupled to and supported between the second pair of arms 134. Accordingly, the first locking bar 136 is configured to rotate about a pivot axis that extends through the first transverse pivot bar 140 relative to the arms 132, and the second locking bar 138 is configured to rotate about a pivot axis that extends through the second transverse pivot bar 142 relative to the arms 134. The first end portion 136*a*, 138*a* of each of the first and second locking bars 136, 138 bars curve upwardly relative to the respective second end portion 136*b*, 138*b* of the first and second locking bars 136, 138 toward the first and second transverse pivot bars 140, 142 to further distance the second end portions 136*b*, 138*b* of the first and second locking bars 136, 138 from the seat 107. As such, when the folding mechanism 120 is in the folded configuration, in which the first and second locking bars 136, 138 extend in a vertical orientation, the first and second locking bars 136, 138 do not protrude through the seat 107. In another aspect of the present disclosure, the middle portion 107*c* of the seat 107 may define a hole through which the second end portions 136*b*, 138*b* of the first and second locking bars 136, 138 extend when the folding mechanism 120 is in the folded configuration.

The second end portion 136*b*, 138*b* of each of the first and second locking bars 136, 138 may be linear along their lengths and the first locking bar 136 may be longer than the second locking bar 138. The second end portions 136*b*, 138*b* of the first and second locking bars 136, 138 extend alongside one another in a parallel orientation relative to a plane of the seat 107 when the walker 100 is in the unfolded or expanded configuration. Stated differently, the second end portions 136*b*, 138*b* of the first and second locking bars 136, 138 share a common plane that is parallel with a plane of the seat 107. The second end portions 136*b*, 138*b* of the first and second locking bars 136, 138 are rotationally coupled to one another via a pivot pin 144 that extends transversely through each of the first and second locking bars 136, 138.

The first folding mechanism 120 further includes a plate 146 that is fixed (e.g., welded) to the second end portion 136*b* of the first locking bar 136. For example, the plate 146 may be affixed to a top surface of the first locking bar 136. Secured to an underside of the plate 146 is a connector 148 configured to releasably, lockingly engage the second end portion 138*b* of the second locking bar 138 when the first and second side frames 102, 104 are in the unfolded configuration. The connector 148 may be an over-center clip (e.g., a U-shaped clip) configured for snap-fit engagement with the second end portion 138*b* of the second locking bar 138 to selectively maintain the first and second locking bars 136, 138 in a horizontal orientation, as shown in FIG. 2.

With reference to FIG. 2, a strap 160 may be provided that includes a first end portion 160*a* extending through a hole in the middle portion 107*c* of the seat 107 for grasping by a user. The strap 160 includes a second end portion 160*b* affixed to an upper surface of the plate 146. When a user exerts a tensile or pulling force on the strap 160, the strap 160 exerts a lifting force on the plate 146/connector 148 to disengage the connector 148 from the second locking bar 138 to allow for the first and second locking bars 136, 138 to rotate in an upward direction (e.g., toward the seat 107) about the pivot pin 144. Downward rotation of the second end portions 136*b*, 138*b* of the first and second locking bars 136, 138 is prevented by the interference between plate 146/connector 148 and the second end portion 138*b* of the second locking bar 138. When the folding mechanism 120 is locked out, the hinge point at pivot pin 144 is offset (e.g., below) the hinge points at transverse pivot bars 140, 142 such that the folding mechanism 120 resists folding upward or downward from a user's weight pushing down on seat 107.

In operation, to transition the walker 100 from the operational configuration (FIG. 1) to the folded configuration (FIGS. 4A-4B), the first end portion 160*a* of the strap 160 may be pulled upwardly to disengage the connector 148 from the second locking bar 138. In aspects, a user may push upwardly on the second end portions 136*b*, 138*b* of the first and second locking bars 136, 138 to disengage the connector 148 from the second locking bar 138. With the first folding mechanism 120 unlocked, the first and second side frames 102, 104 may be collapsed laterally toward one another from the unfolded or expanded configuration to the folded configuration.

The second end portions 136*b*, 138*b* of the first and second locking bars 136, 138 rotate relative to one another about the pivot pin 144 and the first end portions 136*a*, 138*a* of the first and second locking bars 136, 138 rotate relative to the respective first and second seat bars 116, 130. As the first and second locking bars 136, 138 rotate, they transition from a horizontally-oriented position (FIG. 2) to a vertically-oriented position (FIGS. 4A and 4B). During laterally collapsing of the first and second side frames 102, 104, the seat 107 folds on itself to bring the first and second sides 107*a*, 107*b* thereof closer to one another while the middle portion 107*c* of the seat 107 protrudes upwardly. In the folded configuration, the second end portions 136*b*, 138*b* of the first and second locking bars 136, 138 extend vertically, in parallel relation with one another, and remain underneath the center portion 107*c* of the seat 107. The design of the first folding mechanism 120 is such that the folding of the first folding mechanism 120 is not inhibited by the seat 107 that lies directly above the first folding mechanism 120.

Figure 5:
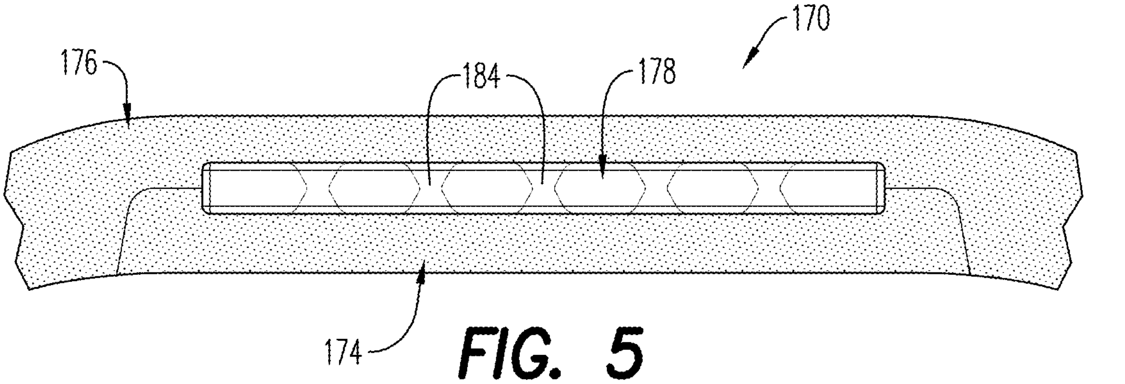
FIG. 5 is a plan view illustrating a handle assembly of the walker of FIG. 1.
Figure 6:
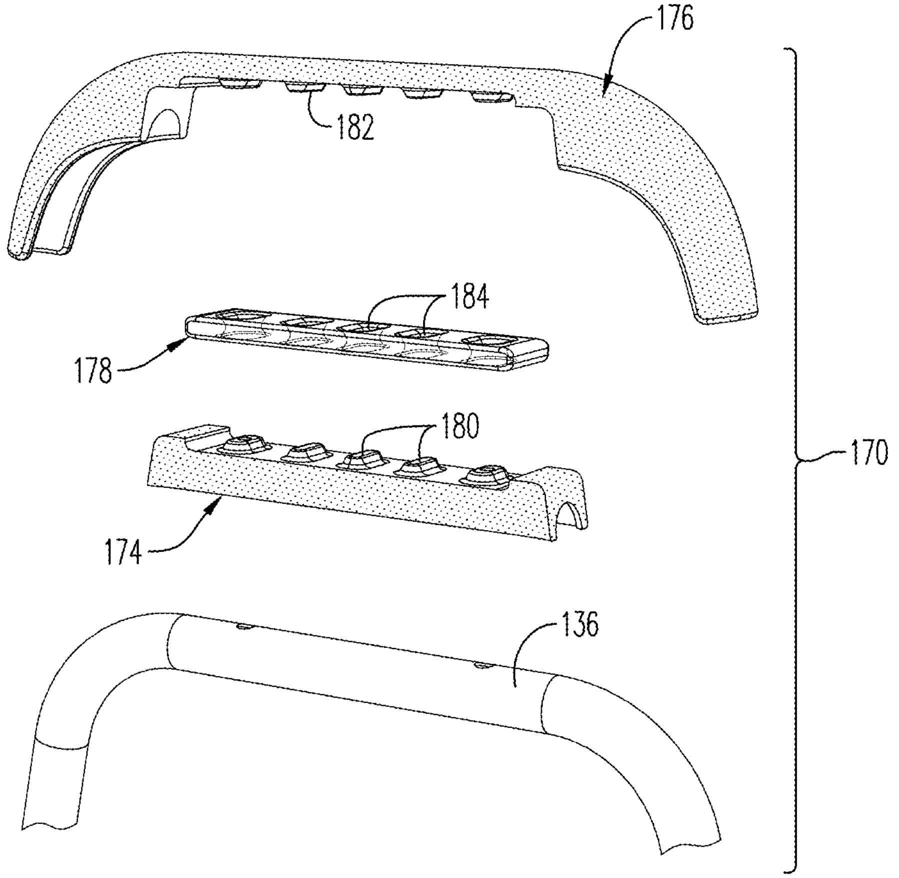
FIG. 6 is a perspective view, with parts separated, of the handle assembly of FIG. 5.

With reference to FIGS. 1, 5, and 6, the walker 100 may include a respective first and second handle assembly 170, 172 positioned over and secured to the first and second handle bars 114, 128. Since each of the first and second handle assemblies 170, 172 are identical or substantially identical, only details of the first handle assembly 170 are provided herein. The first handle assembly 170 is ergonomic and includes a base 174 supported on and secured to the first handle bar 114, a cushion 176 positioned in overlapping alignment with the base 174, and a fluid-filled bladder 178 sandwiched between the base 174 and the cushion 176. In aspects, the fluid within the bladder 178 may be a gas (e.g., air) or a liquid.

The base 174 may be substantially rectangular and includes a plurality protuberances 180 projecting upwardly from an upper surface thereof. The base 174 may be fabricated from a rigid or soft material (e.g., a suitable foam such as urethane foam or EVA foam). The cushion 176 is fabricated from a soft material (e.g., a suitable foam such as urethane foam or EVA foam) and may overlap with the handle bar 114 and curve around a portion of the handle bar 114. The cushion 176 has a plurality of protuberances 182 projecting downwardly from an undersurface thereof. The protuberances 182 of the cushion 176 extend through a plurality of channels 184 defined through the bladder 178 into engagement with the protuberances 180 of the base 174. As such, the protuberances 180, 182 provide structural support for the bladder 178 to prevent the bladder 178 from rolling when pressure is applied while allowing for flexibility. The channels 184 are axially spaced from one another along a length of the bladder 178 and may each have a cone-shaped upper end and an inverted, cone-shaped lower end. The bladder 178 may be fabricated from a transparent, resilient material, such as, for example, silicone, urethane, vinyl, or the like.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended thereto.

What is claimed is:

1. A walker for aiding mobility of a user, comprising:
- a first side frame including:
  - a front leg supporting a wheel;
  - a rear leg supporting a foot;
  - a first handle bar interconnecting the front and rear legs; and
  - a first seat bar extending between and fixed to the front and rear legs;
- a second side frame spaced laterally from the first side frame and including:
  - a front leg supporting a wheel;
  - a rear leg supporting a foot;
  - a second handle bar interconnecting the front and rear legs of the second side frame; and
  - a second seat bar extending between and fixed to the front and rear legs of the second side frame;
- a seat supported between the first and second seat bars, the seat being configured to collapse when the first and second side frames transition from an unfolded configuration to a folded configuration; and
- a first folding mechanism positioned underneath the seat and including:
  - a first locking bar having a first end portion rotationally coupled to the first seat bar, and a second end portion; and
  - a second locking bar having a first end portion rotationally coupled to the second seat bar, and a second end portion extending alongside and rotationally coupled to the second end portion of the first locking bar.

2. The walker according to claim 1, wherein the first and second locking bars are spaced below and extend in parallel relation with the seat when the first and second side frames are in the unfolded configuration.

3. The walker according to claim 1, wherein the first and second locking bars extend parallel with one another and in a horizontal orientation when the first and second side frames are in the unfolded configuration, and the first and second locking bars extend parallel with one another and in a vertical orientation when the first and second side frames are in the folded configuration.

4. The walker according to claim 3, wherein the first and second locking bars are positioned underneath the seat in each of the unfolded and folded configurations of the first and second side frames.

5. The walker according to claim 1, wherein the first end portion of each of the first and second locking bars curves upwardly.

6. The walker according to claim 5, wherein the second end portion of each of the first and second locking bars is linear.

7. The walker according to claim 1, wherein the first folding mechanism further includes:
- a first pair of arms non-rotationally coupled to the first seat bar, the first end portion of the first locking bar being rotationally supported by the first pair of arms; and
- a second pair of arms non-rotationally coupled to the second seat bar, the first end portion of the second locking bar being rotationally supported by the second pair of arms.

8. The walker according to claim 7, wherein the first pair of arms extend below and inwardly of the first seat bar, and the second pair of arms extend below and inwardly of the second seat bar such that the first end portions of the first and second locking bars are positioned underneath the seat and laterally inward of the respective first and second side frames.

9. The walker according to claim 1, wherein the first locking bar is longer than the second locking bar.

10. The walker according to claim 9, wherein the first folding mechanism includes a plate fixed to the second end portion of the first locking bar and configured to releasably, lockingly engage the second end portion of the second locking bar when the first and second side frames are in the unfolded configuration.

11. The walker according to claim 10, further comprising a strap having a first end portion extending upwardly through the seat and accessible by a user, and a second end portion connected to the plate such that a tensile force applied to the strap releases the locking engagement between the plate and the second locking bar.

12. The walker according to claim 1, further comprising a second folding mechanism connected to the front legs of the first and second side frames.

13. The walker according to claim 12, wherein the second folding mechanism includes:
- a first arcuate shaft rotationally coupled at its opposing first and second ends to the front legs of the first and second side frames; and
- a second arcuate shaft rotationally coupled to the first arcuate shaft at a central portion thereof, the second arcuate shaft being rotationally coupled at its opposing first and second ends to the front legs of the first and second side frames.

14. The walker according to claim 1, further comprising a first handle assembly including:

a base supported on the first handle bar;

a cushion positioned in overlapping alignment with the base; and a gas-filled bladder sandwiched between the base and the cushion.

15. A walker for aiding in mobility of a user, comprising:

a first side frame including:

a front leg; and a rear leg;

a second side frame spaced laterally from the first side frame and including:

a front leg; and a rear leg;

a seat supported between the first and second side frames; and a first folding mechanism positioned underneath the seat and configured to laterally collapse the first and second side frames between an unfolded configuration and a folded configuration, the first folding mechanism including:

a first locking bar having a first end portion rotationally coupled to the first side frame, and a second end portion; and a second locking bar having a first end portion rotationally coupled to the second side frame, and a second end portion rotationally coupled to the second end portion of the first locking bar, wherein the first and second locking bars extend parallel with one another and in a horizontal orientation when the first and second side frames are in the unfolded configuration, and the first and second locking bars extend parallel with one another and in a vertical orientation when the first and second side frames are in the folded configuration.

16. The walker according to claim 15, wherein the seat has a first side fixed to the first side frame, and a second side fixed to the second side frame.

17. The walker according to claim 15, wherein the first locking bar is longer than the second locking bar.

18. The walker according to claim 17, wherein the first end portion of each of the first and second locking bars curves upwardly.

19. The walker according to claim 18, wherein the second end portion of each of the first and second locking bars is linear.

20. The walker according to claim 15, further comprising a second folding mechanism connected to the front legs of the first and second side frames.

* * * * *